(12) United States Patent
Yang et al.

(10) Patent No.: US 12,289,422 B2
(45) Date of Patent: Apr. 29, 2025

(54) ELECTRONIC DEVICE

(71) Applicant: Honor Device Co., Ltd., Shenzhen (CN)

(72) Inventors: Nan Yang, Shenzhen (CN); Dan Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 326 days.

(21) Appl. No.: 17/749,809

(22) Filed: May 20, 2022

(65) Prior Publication Data

US 2022/0286548 A1 Sep. 8, 2022

Related U.S. Application Data

(63) Continuation of application No. PCT/CN2021/090276, filed on Apr. 27, 2021.

(30) Foreign Application Priority Data

May 7, 2020 (CN) .......................... 202010376098.6

(51) Int. Cl.
*H04M 1/72403* (2021.01)

(52) U.S. Cl.
CPC ................ *H04M 1/72403* (2021.01)

(58) Field of Classification Search
CPC ........... H04M 1/72403; H04M 1/0264; H04M 1/0266; H04M 2250/52; G06F 1/1686; G06F 3/0488

See application file for complete search history.

(56) References Cited

U.S. PATENT DOCUMENTS

| 11,412,146 | B2 | 8/2022 | Miao | |
|---|---|---|---|---|
| 2009/0197584 | A1* | 8/2009 | Snow | H04M 1/72463 455/418 |
| 2019/0394373 | A1 | 12/2019 | Zhang | |
| 2020/0137314 | A1 | 4/2020 | Tao | |
| 2020/0401263 | A1* | 12/2020 | Chung | G06F 1/1647 |
| 2020/0412854 | A1* | 12/2020 | Cheng | H04M 1/0266 |

(Continued)

FOREIGN PATENT DOCUMENTS

| CN | 103236243 A | 8/2013 |
|---|---|---|
| CN | 104918137 A | 9/2015 |

(Continued)

OTHER PUBLICATIONS

Wikipedia—Framebuffer (Year: 2020).*

*Primary Examiner* — Julio R Perez
(74) *Attorney, Agent, or Firm* — Conley Rose, P.C.

(57) ABSTRACT

An electronic device includes a display screen, a camera, and a first display buffer. The display screen includes a first display area and a second display area, and a material of a display screen corresponding to the second display area is a transparent material. The camera is disposed below the display screen and opposite to a second display area. The first display buffer is configured to store a display signal of the first display area and a display signal of the second display area, and send the display signal of the first display area to the first display area. The first display buffer is further configured to determine, based on whether the camera is started, whether to send the display signal of the second display area to the second display area.

20 Claims, 17 Drawing Sheets

(56) References Cited

U.S. PATENT DOCUMENTS

| | | | |
|---|---|---|---|
| 2021/0151006 A1 | 5/2021 | Yang | |
| 2022/0116546 A1* | 4/2022 | Gummadi | ............. H04M 1/724 |
| 2022/0286548 A1 | 9/2022 | Yang et al. | |
| 2022/0321755 A1* | 10/2022 | Nicholson | ............. H04N 23/73 |

FOREIGN PATENT DOCUMENTS

| | | | |
|---|---|---|---|
| CN | 105094307 A | 11/2015 | |
| CN | 106850897 A | 6/2017 | |
| CN | 108366186 A | 8/2018 | |
| CN | 108710479 A | 10/2018 | |
| CN | 108810281 A | 11/2018 | |
| CN | 108833618 A | 11/2018 | |
| CN | 108900676 A | 11/2018 | |
| CN | 109195000 A | 1/2019 | |
| CN | 109714532 A | 5/2019 | |
| CN | 110149552 A | 8/2019 | |
| CN | 110221651 A | 9/2019 | |
| CN | 110519419 A | 11/2019 | |
| CN | 110569008 A | 12/2019 | |
| CN | 111711718 A | 9/2020 | |
| JP | 2000029456 A | 1/2000 | |
| JP | 2018054691 A | 4/2018 | |
| KR | 20080067246 A | 7/2008 | |
| WO | 2020024696 A1 | 2/2020 | |

* cited by examiner

ELECTRONIC DEVICE

CROSS-REFERENCE TO RELATED APPLICATIONS

This application is a continuation of International Application No. PCT/CN2021/090276, filed on Apr. 27, 2021, which claims priority to Chinese Patent Application No. 202010376098.6, filed on May 7, 2020. The disclosures of the aforementioned applications are hereby incorporated by reference in their entireties.

TECHNICAL FIELD

This application relates to the field of electronic devices, and more specifically, to an electronic device.

BACKGROUND

With popularization of intelligent electronic devices, users have a higher requirement on a screen-to-body ratio of electronic devices.

In an electronic device with a relatively high screen-to-body ratio, a small hole that matches a size of a front-facing camera is disposed on a display screen of the electronic device, and then the front-facing camera is placed in the small hole, so that the user can take a selfie. There is no display unit at the hole in the display screen of the electronic device, that is, no content is displayed at a position of the front-facing camera, thereby affecting an overall display effect of the screen, and causing poor user experience.

SUMMARY

This application provides an electronic device. In the electronic device, a material of an area that is of a display screen and that is opposite to a front-facing camera may be set to a transparent material. When the front-facing camera is not started, the area of the display screen corresponding to the front-facing camera may display content, and the content matches content displayed in another area of the entire electronic device other than the area that is of the display screen and that is opposite to the front-facing camera, so that an overall display effect of the screen of the electronic device is not affected, and user experience is improved.

According to a first aspect, this application provides an electronic device, including: a display screen, where the display screen includes a first display area and a second display area, and a material of a display screen corresponding to the second display area is a transparent material; a camera, where the camera is disposed below the display screen and opposite to the second display area; and a first display buffer, where the first display buffer is configured to store a display signal of the first display area and a display signal of the second display area, and send the display signal of the first display area to the first display area; and the first display buffer is further configured to determine, based on whether the camera is started, whether to send the display signal of the second display area to the second display area.

The foregoing camera refers to a front-facing camera, and the front-facing camera may be used by a user to photograph a foreground or the user to take a selfie.

The foregoing electronic device may be a mobile phone.

The electronic device includes the display screen, the camera disposed below the display screen, and the first display buffer. The display screen includes the first display area and the second display area, and the material of the display screen corresponding to the second display area is a transparent material, and the second display area is disposed opposite to the camera. The first display buffer stores the display signal of the first display area and the display signal of the second display area. The first display buffer may send the display signal of the first display area to the first display area, and the first display buffer determines, based on whether the camera is started, whether to send the display signal of the second display area to the second display area, so that the overall display effect of the electronic device is not affected, and user experience is improved.

With reference to the first aspect, in a possible implementation, the first display buffer is further specifically configured to: when the camera is not started, send the display signal of the second display area to the second display area, and control matching between the display signal sent to the first display area and the display signal sent to the second display area; or when the camera is started, prevent the display signal of the second display area from being sent to the second display area.

Matching between the display signal sent to the second display area and the display signal sent to the first display area may be understood as follows: On the display screen of the electronic device, content displayed in the second display area and content displayed in the first display area may form a complete image.

When the camera of the electronic device is not started, the first display buffer sends the display signal of the second display area to the second display area, and controls matching between the display signal sent to the first display area and the display signal sent to the second display area, so that when the camera of the electronic device is not started, an overall display effect of the electronic device is not affected, and user experience is improved. When the camera is started, the display signal of the second display area is prevented from being sent to the second display area, so that when the camera of the electronic device is started, the user's use of the camera of the electronic device is satisfied, and user experience is improved.

With reference to the first aspect, in a possible implementation, the first display buffer includes a sub buffer section, where the sub buffer section is used to store the display signal of the second display area, the sub buffer section includes a flag, and the flag is used to indicate whether the camera is started.

A sub buffer section is disposed in the first display buffer, and the sub buffer section is used to store the display signal of the second display area. The sub buffer section includes a flag, and the flag indicates whether the camera is started. Therefore, the first display buffer may determine, based on the flag, whether the camera is started, so as to determine whether to send the display signal buffered in the second display area to the second display area, so as to complete displaying on the second display area. Therefore, the overall display effect of the electronic device is not affected, and user experience is improved.

With reference to the first aspect, in a possible implementation, when a value of the flag is true, the camera is not started; or when the value of the flag is false, the camera is started.

With reference to the first aspect, in a possible implementation, the electronic device further includes a second display buffer, where the second display buffer is configured to read a display signal that is of the second display area and that is stored in the first display buffer, and the second display buffer is further configured to: when the camera is not started, send the display signal of the second display area to the second display area; or when the camera is started, prevent the display signal of the second display area from being sent to the second display area.

The second display buffer is disposed in the electronic device, and the second display buffer may read the display signal that is of the second display area and that is stored in the first display buffer; or when the camera is not started, the second display buffer sends the display signal of the second display area to the second display area, so that when the camera of the electronic device is not started, the display signal is displayed in the second display area. Therefore, the overall display effect of the electronic device, and user experience is improved. When the camera is started, the display signal of the second display area is prevented from being sent to the second display buffer in the second display area, so that the user's use of the camera of the electronic device is satisfied, and user experience is improved.

Optionally, the second display buffer determines, in two manners, whether the camera of the electronic device is started. In a first manner, the first display buffer may detect whether the camera of the electronic device is started, and send an instruction to the second display buffer, where the instruction is used to indicate whether the camera of the electronic device is started. The second display buffer determines, based on the foregoing instruction, whether to send the display signal of the transparent area to the transparent area. In a second manner, the second display buffer may detect whether the camera of the electronic device is started, and determine, based on a result of detecting whether the camera of the electronic device is started, whether to send the display signal of the transparent area to the transparent area.

With reference to the first aspect, in a possible implementation, when the camera is not started, the second display buffer is further configured to drop a frame, so that the display signal sent to the first display area matches the display signal sent to the second display area, and the second display buffer is further configured to determine a quantity D of dropped frames based on the following formula:

$$D=(B+C-A) \times f$$

where f is a frame rate; A is a time at which the first buffer sends the display signal of the first display area to the first display area; B is a time at which the second buffer reads the display signal of the second display area from the first buffer; and C is a time at which the second buffer sends the display signal of the second display area to the second display area.

When the camera is not started, the second display buffer may perform a frame dropping operation based on relationships between the time at which the first buffer sends the display signal of the first display area to the first display area, the time at which the second buffer reads the display signal of the second display area from the first buffer, and the time C at which the second buffer sends the display signal of the second display area to the second display area, and the frame rate, so that the display signal sent to the first display area matches the display signal sent to the second display area, and the overall display effect of the electronic device is not affected.

With reference to the first aspect, in a possible implementation, when the camera is started, the camera captures an image by using the second display area.

With reference to the first aspect, in a possible implementation, the display screen includes a first display screen and a second display screen, where the first display screen is corresponding to the first display area, and the second display screen is corresponding to the second display area.

With reference to the first aspect, in a possible implementation, display brightness of the second display area is a times display brightness of the first display area, where a is greater than or equal to 1; and a may be obtained by collecting statistics about historical brightness data used by the user for the electronic device.

Specifically, because a camera is disposed opposite to the second display area, and a color of the camera is relatively dark, there is a mismatch between the display brightness of the second display area and the display brightness of the first display area. Therefore, the display brightness of the second display area is a times the display brightness of the first display area, and a is greater than or equal to 1, so that the display brightness of the first display area can achieve a same display effect as the second display area, thereby improving user experience.

With reference to the first aspect, in a possible implementation, a material of the display screen corresponding to the first display area is a transparent material.

DESCRIPTION OF EMBODIMENTS

The following describes technical solutions in this application with reference to accompanying drawings.

An electronic device in an embodiment of this application may include a handheld device, an in-vehicle device, a wearable device, a computing device, or another processing device connected to a wireless modem; may also include a subscriber unit, a cellular phone (cellular phone), a smart phone (smart phone), a wireless data card, a personal digital assistant (personal digital assistant, PDA) computer, a tablet computer, a modem (modem), a handset (handset), a laptop computer (laptop computer), a machine type communication (machine type communication, MTC) terminal, a point of sales (point of sales, POS), an in-vehicle computer, a station (station, ST) in a wireless local area network (wireless local area network, WLAN); or may be a cellular phone, a cordless phone, a session initiation protocol (session initiation protocol, SIP) phone, a wireless local loop (wireless local loop, WLL) station, a terminal device in a next-generation communications system (such as a 5G network), a terminal device in a public land mobile network (public land mobile network, PLMN), or another electronic device with a camera. For example, the communications apparatus may be a mobile phone, a tablet computer, or an electronic product with a camera.

The wearable device may also be referred to as a wearable smart device, and is a general term for daily wearable devices that are smartly designed and developed by using wearable technologies, such as glasses, gloves, watches, apparels, and shoes. A wearable device is a portable device that can be worn directly on the body or integrated into the clothing or accessories of a user. The wearable device is not merely a hardware device, it can implement a powerful function based on software support, and data interaction, and cloud interaction. Generalized wearable smart devices include large-sized smart devices that can implement some functions without relying on a smartphone, such as smartwatches or smart glasses, and also include smart devices that focus on a particular application function and need to work with another device such as a smartphone, such as smart bands and smart jewelry that are used for sign monitoring.

The following uses an example in which the electronic device is a mobile phone for detailed description.

Figure 1:
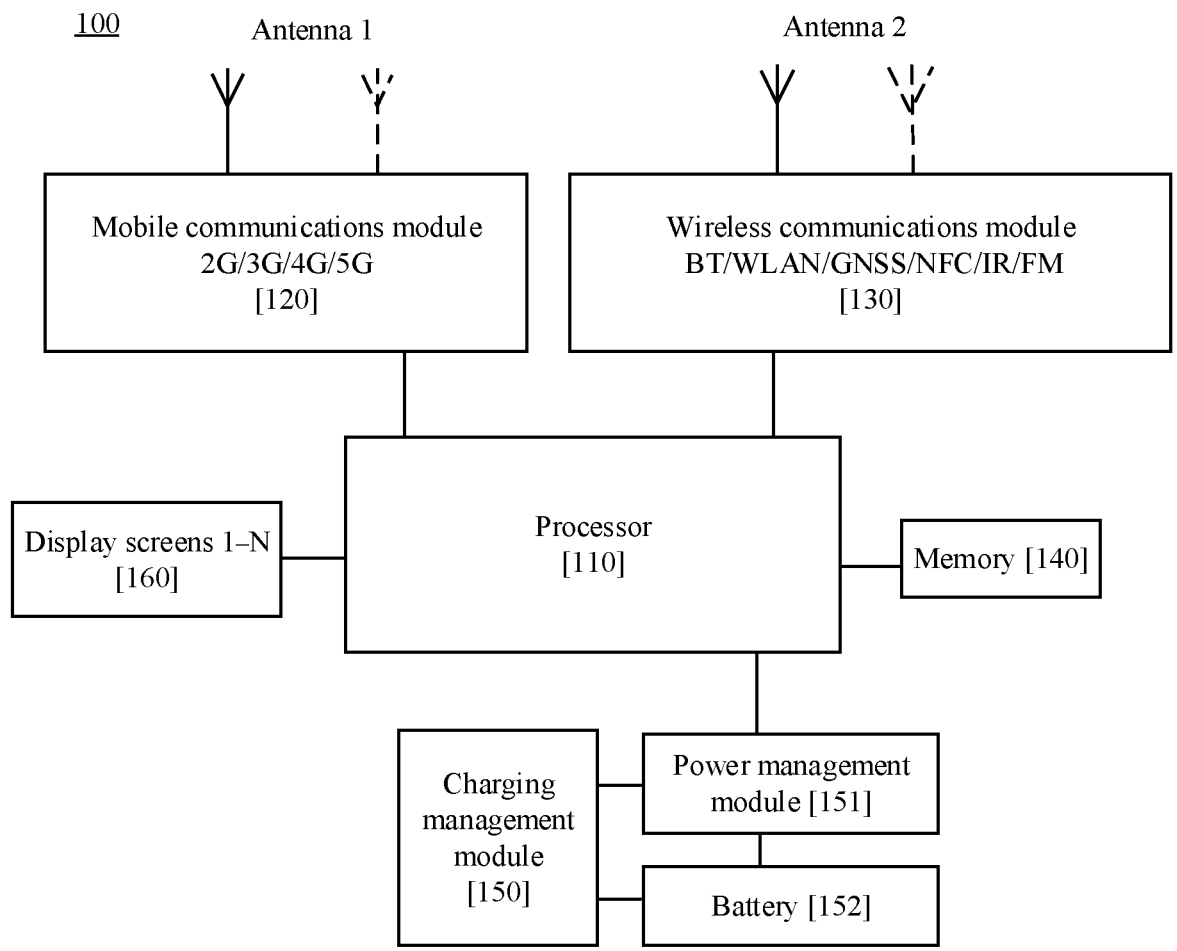
FIG. 1 is a schematic structural diagram of an electronic device according to an embodiment of this application.

FIG. 1 is a schematic structural diagram of an electronic device 100 according to an embodiment of this application. The electronic device 100 may include a processor 110, an antenna 1, an antenna 2, a mobile communications module 120, a wireless communications module 130, a memory 140, a charging management module 150, a power management module 151, a battery 152, and a display screen 160.

It may be understood that a structure shown in an embodiment of this application does not constitute a specific limitation on the electronic device 100. In some other embodiments of this application, the electronic device 100 may include more or fewer components than those shown in the figure, or combine some components, or split some components, or have different component arrangements. The components shown may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a neural center and a command center of the electronic device 100. The controller may generate an operation control signal based on an instruction operation code and a time sequence signal, so as to control retrieval and execution of the instruction.

A memory may also be disposed on the processor 110 to store an instruction and data. In some embodiments, the memory in the processor 110 is a cache memory. The memory may store an instruction or data that is just used or used cyclically by the processor 110. If the processor 110 needs to use the instruction or data again, the instruction or data may be directly invoked from the memory. Repeated access is avoided, and a waiting time of the processor 110 is reduced, thereby improving system efficiency.

In some embodiments, the processor 110 may include one or more interfaces. The interface may be an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI) interface, a general-purpose input/output (general-purpose input/output, GPIO) interface, a subscriber identity module (subscriber identity module, SIM) interface, a universal serial bus (universal serial bus, USB) interface, and/or the like.

The antenna 1 and the antenna 2 are configured to transmit and receive electromagnetic wave signals. Each antenna in the electronic device 100 may be configured to cover a single or a plurality of communications bands. Different antennas may be multiplexed to improve antenna utilization. For example, the antenna 1 may be multiplexed into a diversity antenna of a wireless local area network. In some other embodiments, the antenna may be used in combination with a tuning switch.

The electronic device 100 may include a communications module, configured to communicate with an external device. For example, the communications module may include a mobile communications module 120 and a wireless communications module 130.

The mobile communications module 120 may provide a wireless communication solution that is applied to the electronic device 100, including 2G/3G/4G/5G. The mobile communications module 120 may include at least one filter, a switch, a power amplifier, a low noise amplifier (low noise amplifier, LNA), and the like. The mobile communications module 120 may receive an electromagnetic wave from the antenna 1, perform processing such as filtering and amplification on the received electromagnetic wave, and send the electromagnetic wave to the modem processor for demodulation. The mobile communications module 120 may further amplify a signal modulated by the modem processor, and convert the signal into an electromagnetic wave and radiate the electromagnetic wave by using the antenna 1. In some embodiments, at least some of the functional modules of the mobile communications module 120 may be disposed in the processor 110. In some embodiments, at least some of the functional modules of the mobile communications module 120 may be disposed in a same device as at least some of the modules of the processor 110.

The wireless communications module 130 may provide a wireless communication solution that is applied to the electronic device 100, including wireless local area network (wireless local area network, WLAN) (such as a wireless fidelity (wireless fidelity, Wi-Fi) network), Bluetooth (Bluetooth, BT), global navigation satellite system (global navigation satellite system, GNSS), frequency modulation (frequency modulation, FM), near field communication (near field communication, NFC), infrared (infrared, IR), and the like. The wireless communications module 130 may be one or more components that integrate at least one communication processing module. The wireless communications module 130 receives an electromagnetic wave by using the antenna 2, modulates and filters the electromagnetic wave signal, and sends the processed signal to the processor 110. The wireless communications module 130 may further receive a to-be-sent signal from the processor 110, perform frequency modulation and amplification on the signal, and convert the signal into an electromagnetic wave and radiate the electromagnetic wave by using the antenna 2.

In some embodiments, the antenna 1 of the electronic device 100 is coupled to the mobile communications module 120, and the antenna 2 is coupled to the wireless communications module 130, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, an IR technology, and the like. The GNSS may include a global positioning system (global positioning system, GPS), a global navigation satellite system (global navigation satellite system, GLONASS), a Beidou navigation satellite system (Beidou navigation satellite system, BDS), a quasi-zenith satellite system (quasi-zenith satellite system, QZSS), and/or a satellite based augmentation system (satellite based augmentation system, SBAS).

The memory 140 may be configured to store computer executable program code, where the executable program code includes an instruction. The processor 110 executes various function applications and data processing of the electronic device 100 by running an instruction stored in the memory 140. The memory 140 may include a program storage area and a data storage area. The program storage area may store an operating system, an application program required by at least one function (such as a sound play function or an image play function), or the like. The data storage area may store data (such as audio data or a phone book) created during use of the electronic device 100. In addition, the memory 140 may include a high-speed random access memory, and may also include a non-volatile memory, such as at least one magnetic disk storage device, a flash memory device, or a universal flash storage (universal flash storage, UFS).

The charging management module 150 is configured to receive a charging input from a charger. The charger may be a wireless charger, or may be a wired charger. In some wired charging embodiments, the charging management module 150 may receive a charging input of a wired charger by using a USB interface. In some wireless charging embodiments, the charging management module 150 may receive a wireless charging input by using a wireless charging coil of the electronic device 100. In addition to charging the battery 152, the charging management module 150 may further supply power to the electronic device 100 by using the power management module 151.

The power management module 151 is configured to connect the battery 152, the charging management module 150, and the processor 110. The power management module 151 receives an input of the battery 152 and/or an input of the charging management module 150, and supplies power to the processor 110, the memory 140, the display 160, the mobile communications module 120, the wireless communications module 130, and the like. The power management module 151 may be further configured to monitor parameters such as a battery capacity, a quantity of battery cycles, and a battery health state (leakage or impedance). In some other embodiments, the power management module 151 may alternatively be disposed in the processor 110. In some other embodiments, the power management module 151 and the charging management module 150 may alternatively be disposed in a same device.

The electronic device 100 implements a display function by using the GPU, the display screen 160, the application processor, and the like. The GPU is a microprocessor for image processing, and is connected to the display screen 160 and the application processor. The GPU is configured to perform mathematical and geometric calculations and is configured to render graphics. The processor 110 may include one or more GPUs that execute a program instruction to generate or change display information.

The display screen 160 is configured to display an image, a video, and the like. The display screen 160 includes a display panel. The display panel may be a liquid crystal display (liquid crystal display, LCD), an organic light emitting diode (organic light-emitting diode, OLED), an active matrix organic light emitting diode (active-matrix organic light emitting diode, AMOLED), a flex light emitting diode (flex light-emitting diode, FLED), a Miniled, a MicroLed, a Micro-oLed, quantum dot light emitting diodes (quantum dot light emitting diodes, QLED), or the like. In some embodiments, the electronic device 100 may include one or N display screens 160, where N is a positive integer greater than 1.

Figure 2:
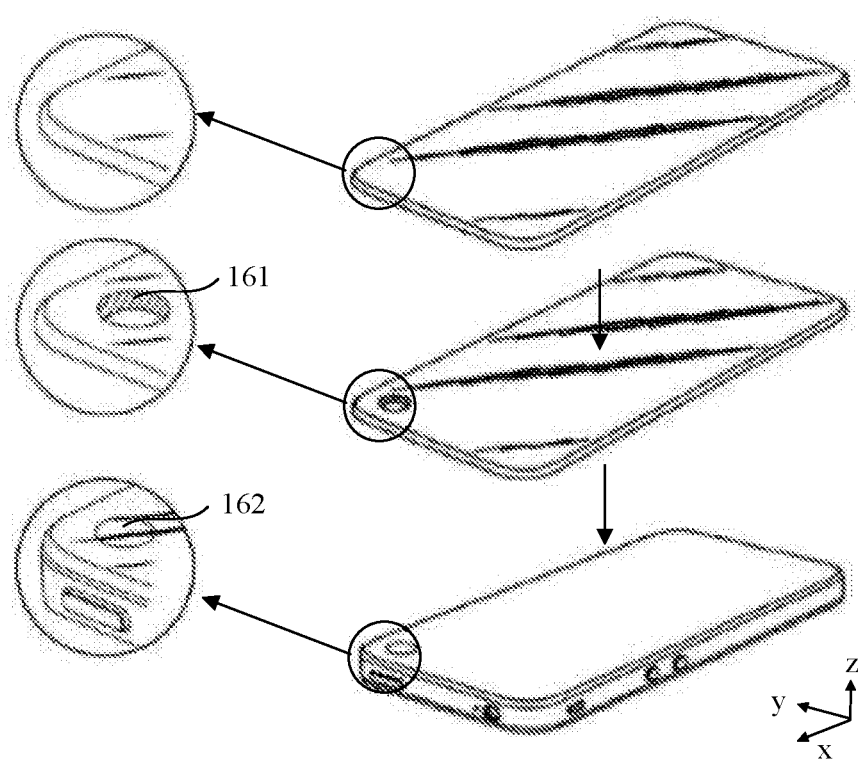
FIG. 2 is a schematic structural diagram of an electronic device.

Currently, to meet users' requirements on electronic devices, screen-to-body ratios of more and more electronic devices are increasingly high. For example, FIG. 2 is a schematic diagram of an electronic device with a hole-dug screen. The hole-dug screen means that a hole is dug in the display screen for placing a front-facing camera. In the display screen 500 shown in FIG. 7, a hole 161 is disposed in an area 163 of the display screen 500. The hole 161 penetrates the display screen 500 in a thickness direction of the display screen. A size of the hole 161 matches a size of a front-facing camera 162, and the front-facing camera 162 is disposed in the hole 161, so as to meet a user's requirement on use of the front-facing camera 162 of the electronic device.

Figure 3A:
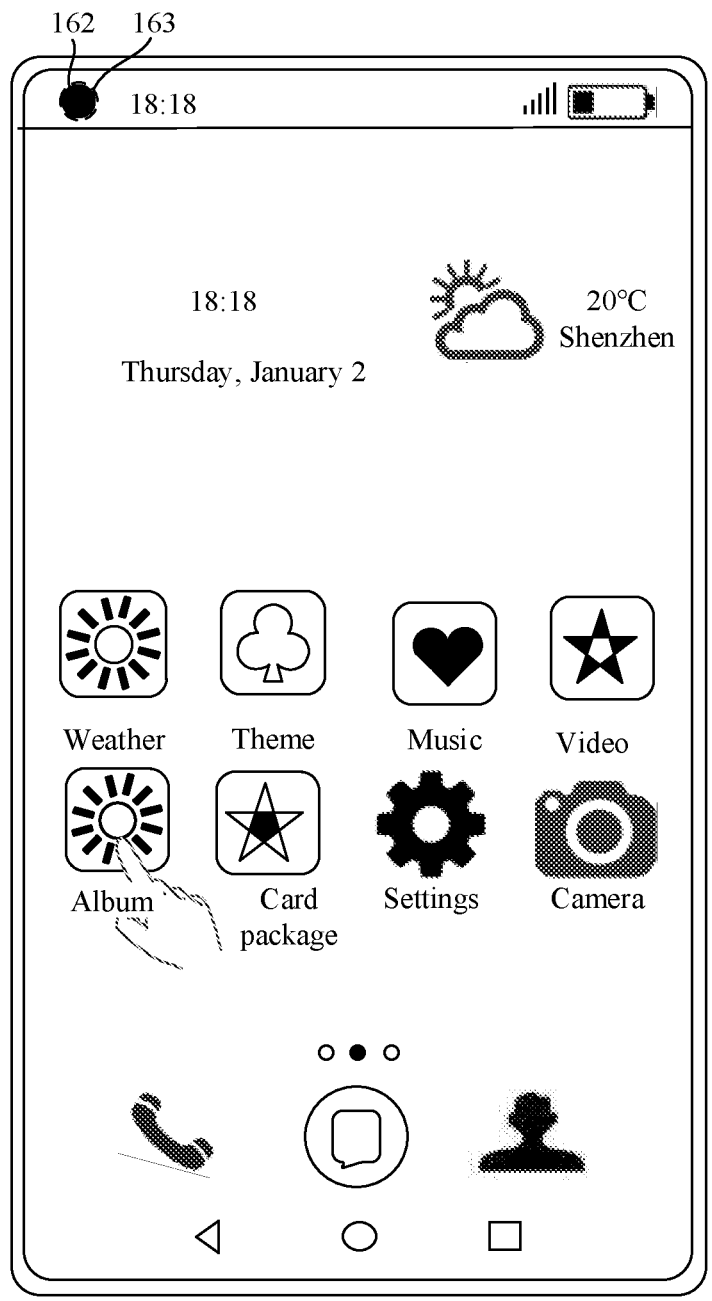
FIG. 3(a)-FIG. 3(d) are schematic diagrams of a group of graphical user interfaces (GUIs) of an electronic device.
Figure 3B:
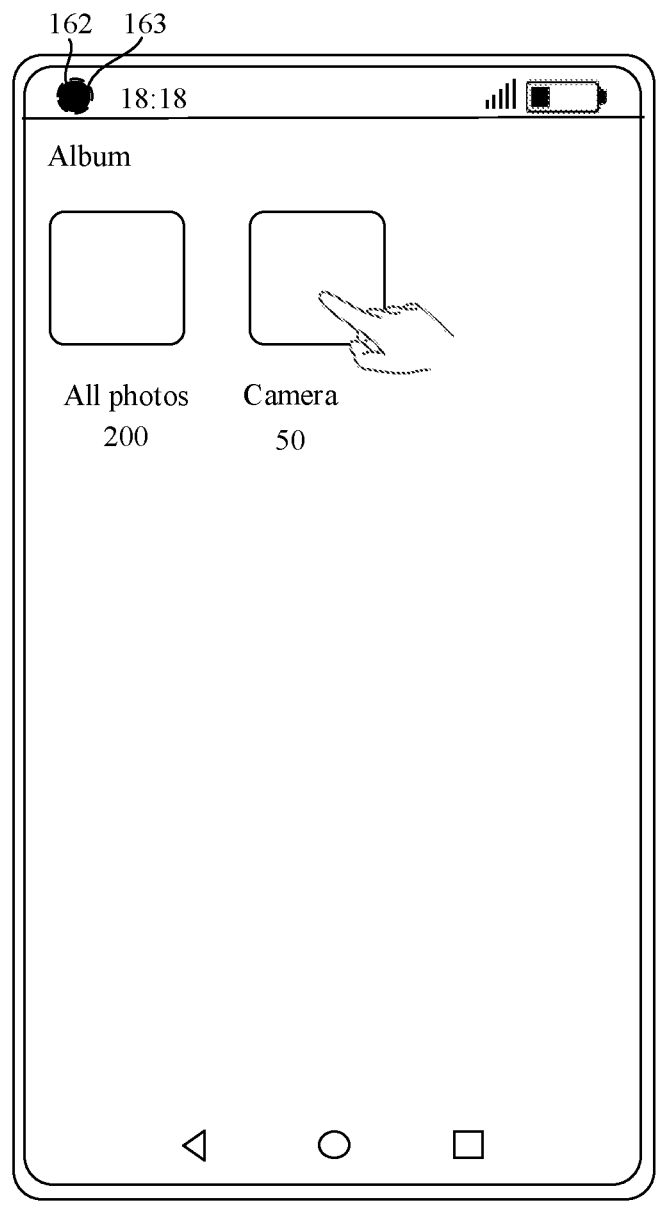
Figure 3C:
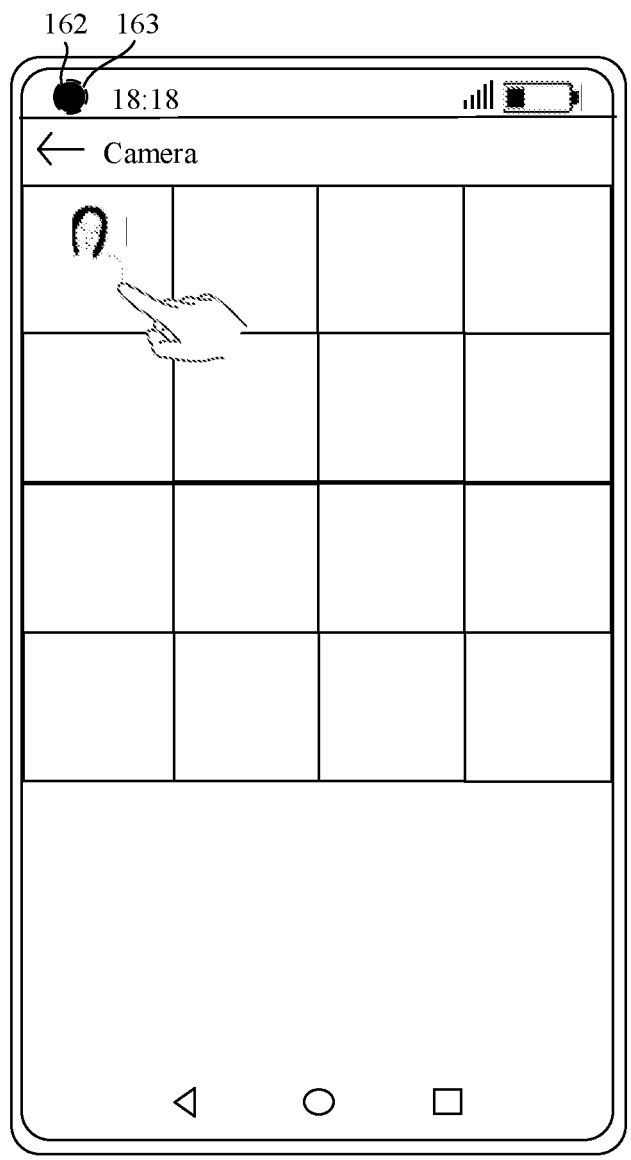
Figure 3D:
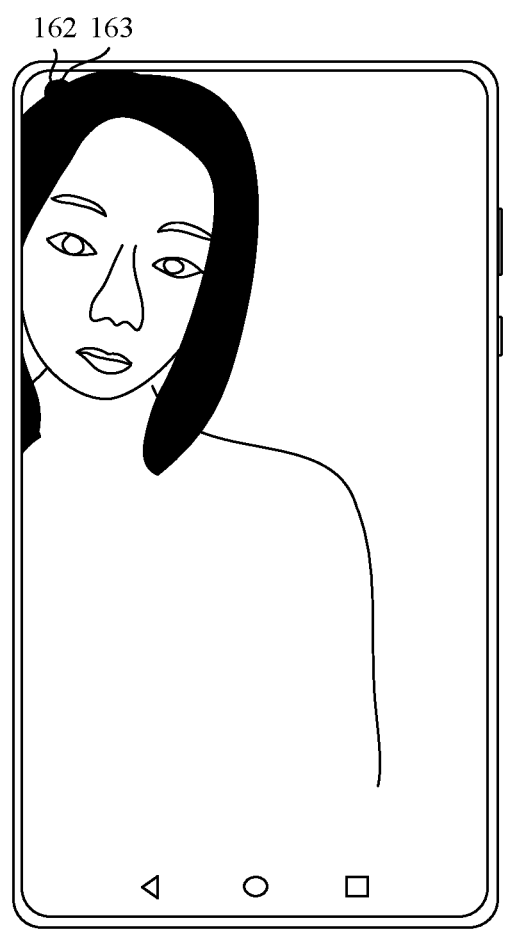

For example, FIG. 3(a)-FIG. 3(d) are schematic diagrams of a group of graphical user interfaces (graphical user interface, GUI) of an electronic device with a hole-dug screen. Referring to FIG. 3(a), the GUI is a desktop of the electronic device. The desktop of the electronic device includes three desktop pages, and each desktop page includes icons of one or more application programs. The current desktop of the electronic device displays a second desktop page, and the desktop page includes a "Weather" icon, a "Theme" icon, a "Music" icon, a "Video" icon, an "Album" icon, a "Card package" icon, a "Settings" icon, and a "Camera" icon. In this case, because no corresponding display unit is disposed in the area 163 corresponding to the front-facing camera 162 in the electronic device, the front-facing camera 162 of the electronic device can be seen in the area 163 that passes through the electronic device. When the electronic device detects that the user taps the "Album" icon, the GUI of the electronic device is a display interface shown in FIG. 3(b). When the electronic device detects that the user taps the "Camera" icon, the GUI of the electronic device is a display interface shown in FIG. 3(c). When the electronic device detects that the user taps the first picture, the GUI of the electronic device is a display interface shown in FIG. 3(d). In this case, a display unit is not disposed at a position of the area 163 of the electronic device, and therefore, the area 163 does not display any content. The user can still see the front-facing camera 162, and the user cannot see the picture content that is shielded by the camera 162 in the picture, thereby affecting an overall display effect of the electronic device.

Figure 4A:
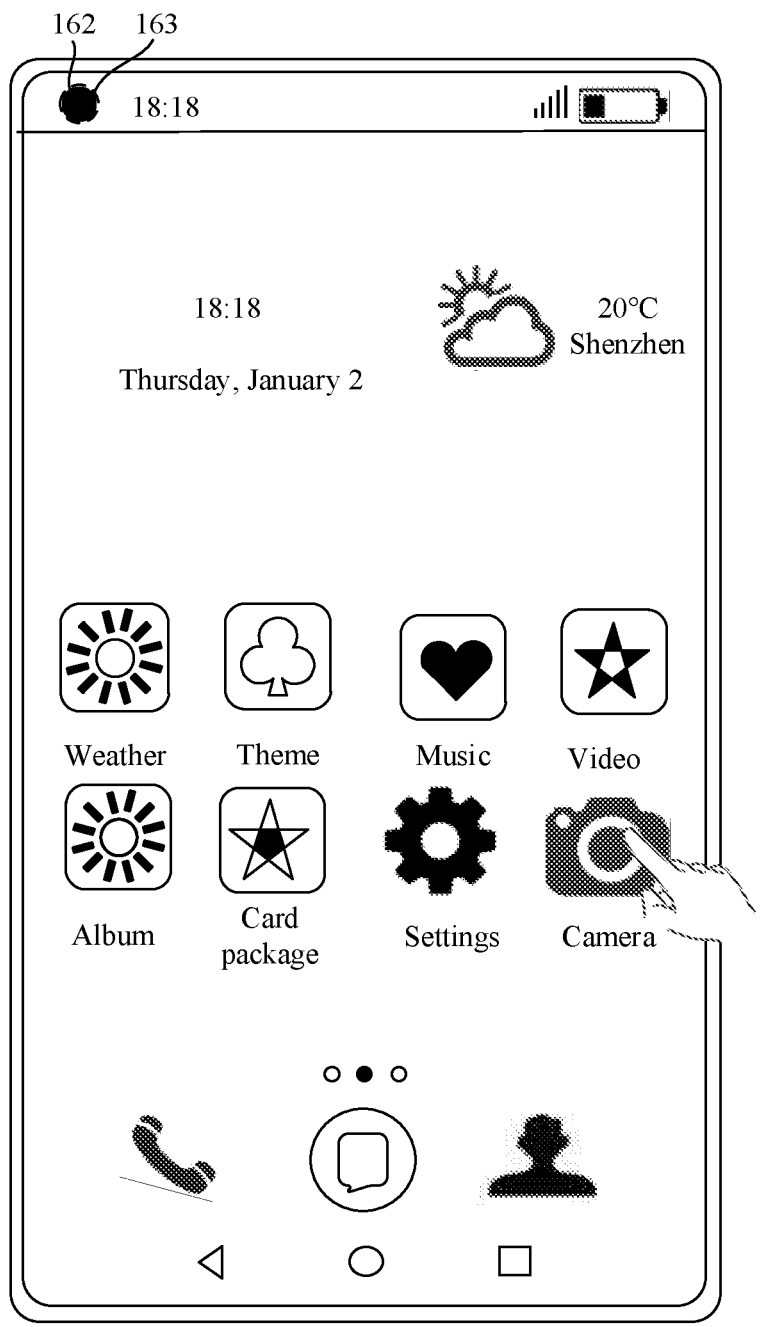
FIG. 4(a)-FIG. 4(b) are schematic diagrams of another group of GUIs of an electronic device.
Figure 4B:
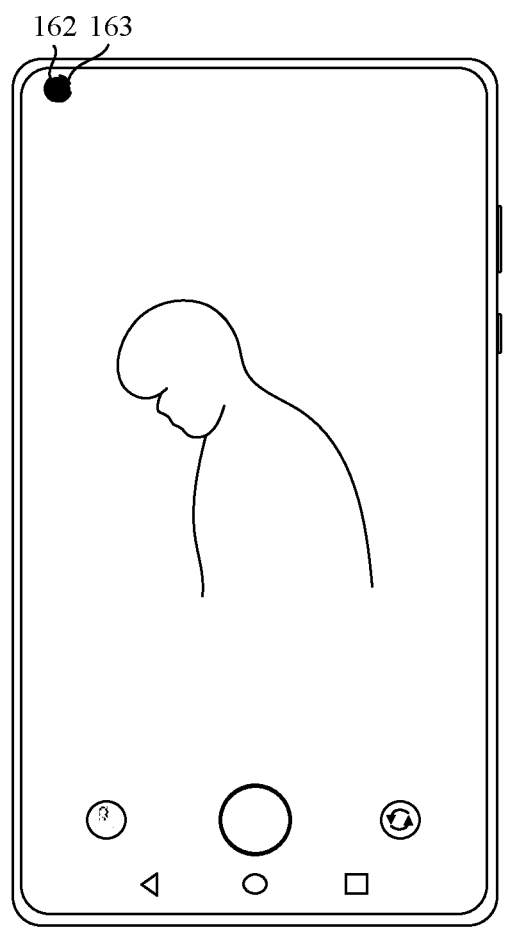
Figure 5A:
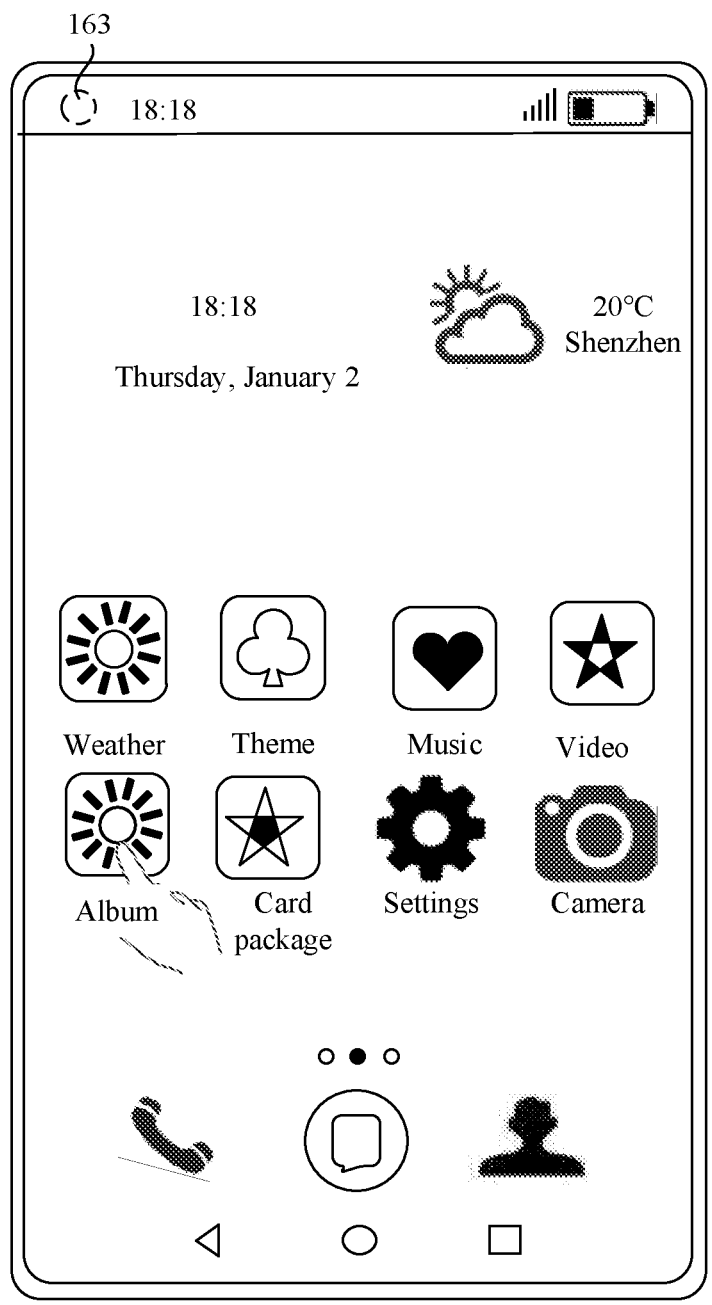
FIG. 5(a)-FIG. 5(d) are schematic diagrams of a group of GUIs according to an embodiment of this application.
Figure 5B:
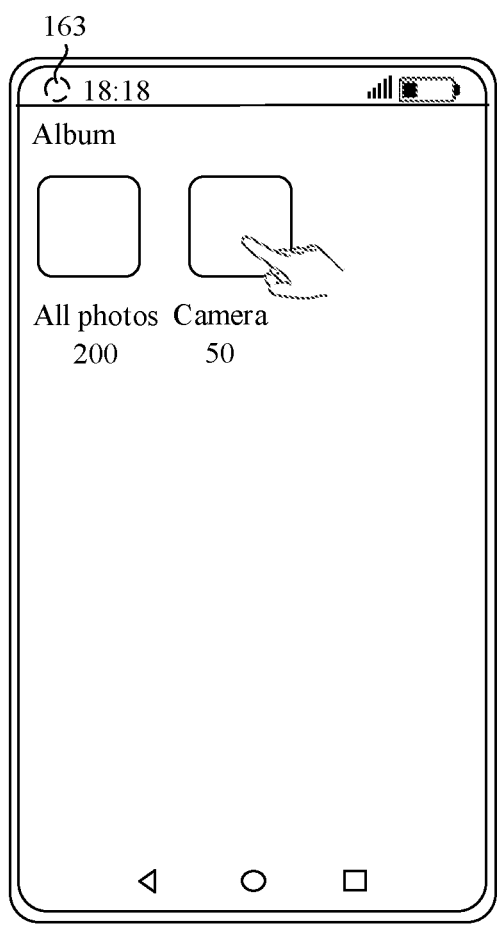
Figure 5C:
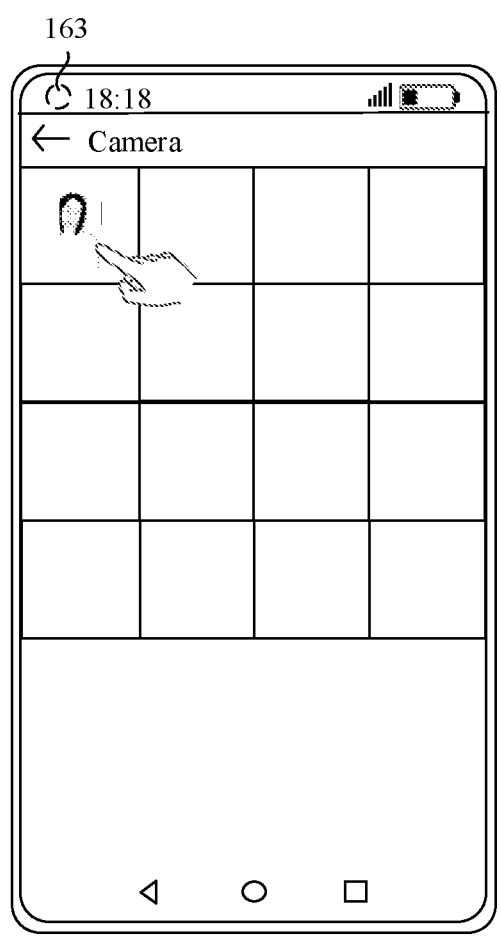
Figure 5D:
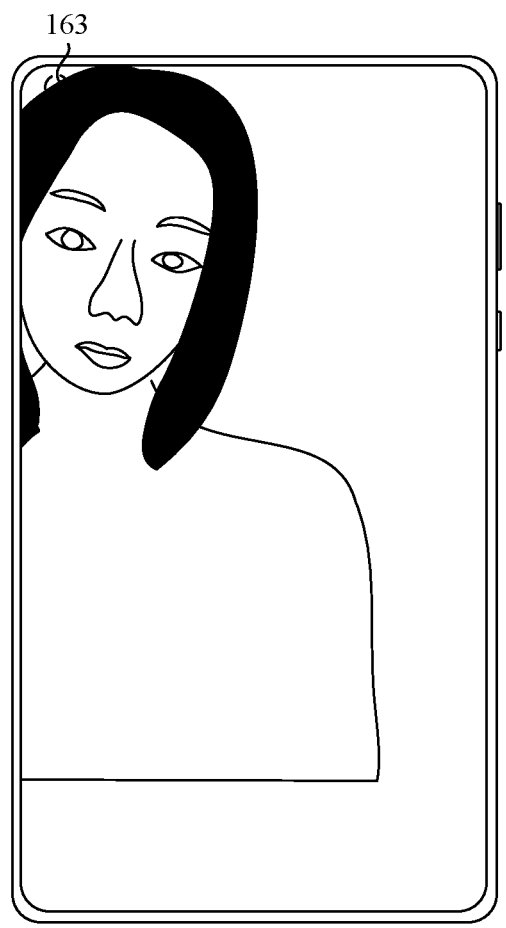

For another example, FIG. 4(*a*)-FIG. 4(*b*) are schematic diagrams of another group of GUIs of an electronic device with a hole-dug screen. Referring to FIG. 4(*a*), the GUI is a desktop of the electronic device. The desktop of the electronic device includes four desktop pages, and each desktop page includes icons of one or more application programs. The current desktop of the electronic device displays a second desktop page, and the desktop page includes a "Weather" icon, a "Theme" icon, a "Music" icon, a "Video" icon, an "Album" icon, a "Card package" icon, a "Settings" icon, and a "Camera" icon. In this case, the front-facing camera 162 of the electronic device can be seen in the area 163 that passes through the electronic device. After the electronic device detects that the user clicks the "Camera" icon, the GUI of the electronic device is a display interface shown in FIG. 4(*b*). In this case, because no display unit is disposed at a position of the area 163 of the electronic device, the area 163 does not display any content, and the user can still see the front-facing camera 162.

For example, FIG. 5(*a*)-FIG. 5(*d*) are schematic diagrams of a group of GUIs of an electronic device according to an embodiment of this application. Referring to FIG. 5(*a*), the GUI is a desktop of the electronic device. The desktop of the electronic device includes five desktop pages, and each desktop page includes icons of one or more application programs. The current desktop of the electronic device displays a second desktop page, and the desktop page includes a "Weather" icon, a "Theme" icon, a "Music" icon, a "Video" icon, an "Album" icon, a "Card package" icon, a "Settings" icon, and a "Camera" icon. In this case, a material of the display screen in the area 163 corresponding to the front-facing camera 162 in the electronic device is a transparent material, and a corresponding display unit is disposed. Therefore, when the electronic device detects that the front-facing camera 163 is not started, corresponding content is displayed in the area 163, and the front-facing camera 162 of the electronic device cannot be seen in the area 163 of the electronic device. When the electronic device detects that the user taps the "Album" icon, the GUI of the electronic device is shown in FIG. 5(*b*). When the electronic device detects that the user taps the "Camera" icon, the GUI of the electronic device is a display interface shown in FIG. 5(*c*). When the electronic device detects that the user taps the first picture, the GUI of the electronic device is shown in FIG. 5(*d*). In this case, the user can see the entire picture.

Figure 6A:
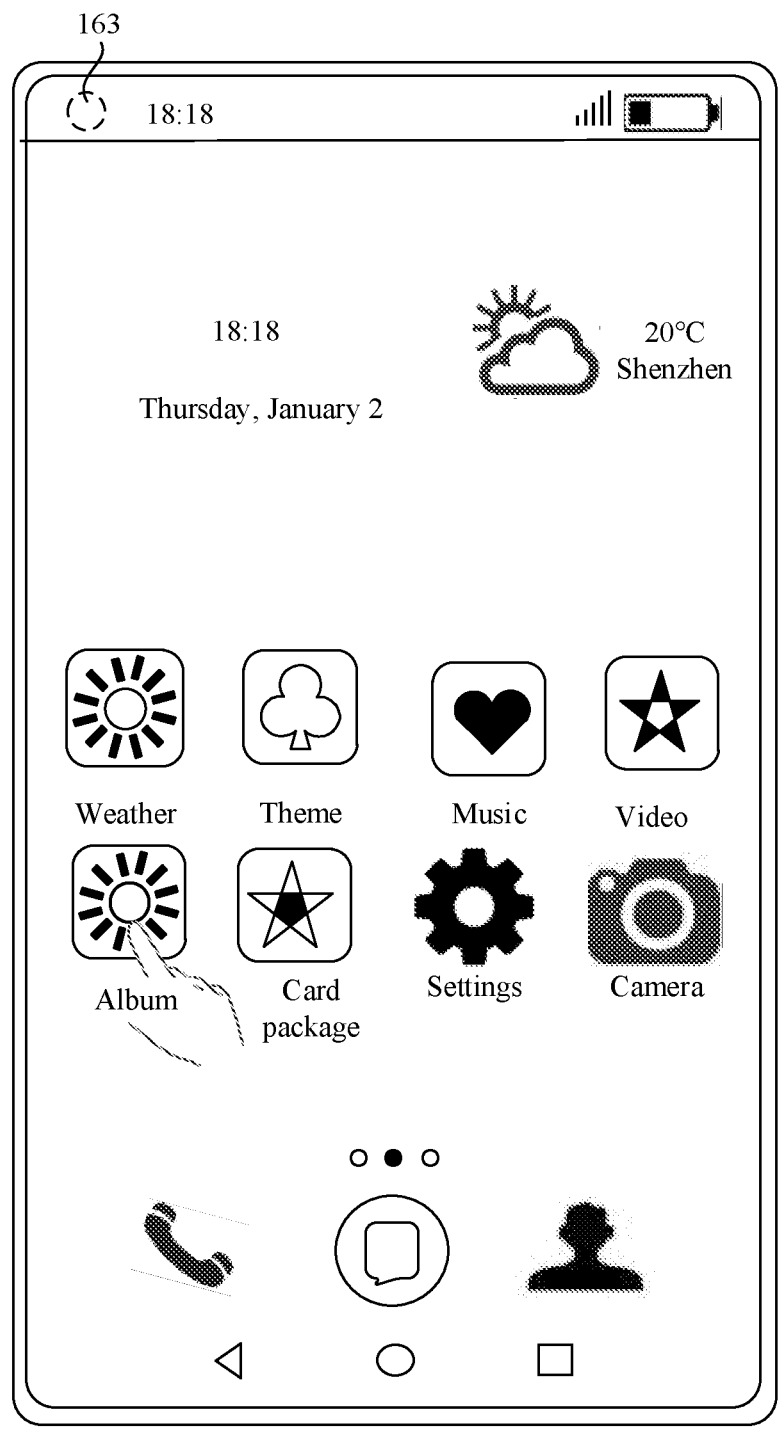
FIG. 6(a)-FIG. 6(b) are schematic diagrams of another group of GUIs according to an embodiment of this application.
Figure 6B:
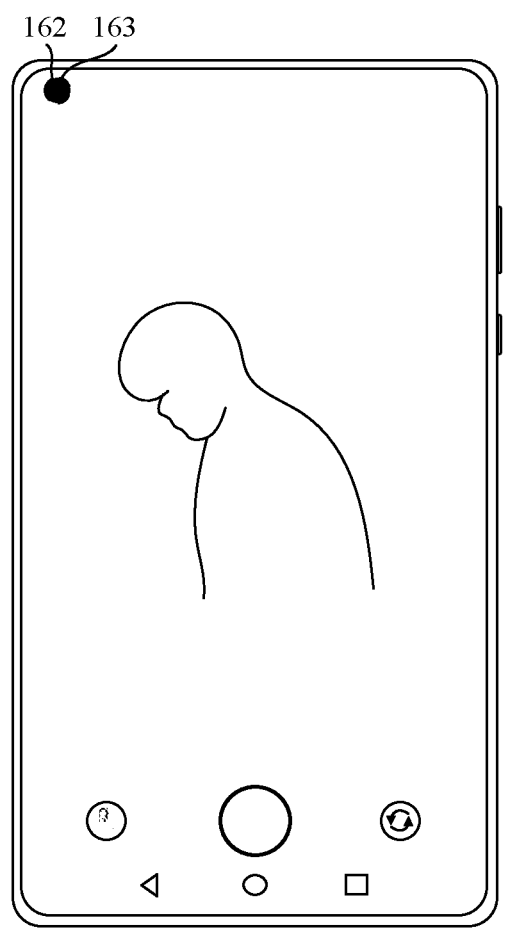

For another example, FIG. 6(*a*)-FIG. 6(*b*) are schematic diagrams of another group of GUIs of an electronic device according to an embodiment of this application. Referring to FIG. 6(*a*), the GUI is a desktop of the electronic device. The desktop of the electronic device includes four desktop pages, and each desktop page includes icons of one or more application programs. The current desktop of the electronic device displays a second desktop page, and the desktop page includes a "Weather" icon, a "Theme" icon, a "Music" icon, a "Video" icon, an "Album" icon, a "Card package" icon, a "Settings" icon, and a "Camera" icon. In this case, a material of the display screen in the area 163 corresponding to the front-facing camera 162 in the electronic device is a transparent material, and a corresponding display unit is disposed. Therefore, when the electronic device detects that the front-facing camera 163 is not started, corresponding content is displayed in the area 163, and the front-facing camera 162 of the electronic device cannot be seen in the area 163 of the electronic device. After the electronic device detects that the user taps the "Camera" icon, the GUI of the electronic device is a display interface shown in FIG. 6(*b*). In this case, because the electronic device detects that the front-facing camera 162 is started, the display unit at the position of the area 163 does not display content, and the user may see the front-facing camera 162 by using the area 163, that is, the user may take a selfie.

When the front-facing camera of the electronic device is not started, the area 163 of the electronic device displays corresponding content (which forms complete content with the content displayed in a non-transparent area 164), so that an overall display effect of the electronic device is not affected. When the front-facing camera 162 of the electronic device is started, the area 163 of the electronic device does not display content, so that the front-facing camera 162 of the electronic device captures an image by using the area 163, thereby improving user experience.

To facilitate understanding of this embodiment of this application, the following descriptions are provided before the embodiment of this application is described.

First, in all the accompanying drawings in an embodiment of this application, directions of the x-axis, the y-axis, and the z-axis are perpendicular to each other. The direction of the z-axis may be understood as a thickness direction of the electronic device, and the direction of the z-axis is a direction from a rear case of the electronic device to a screen of the electronic device. The direction of the x-axis may be understood as a length direction of the electronic device. The direction of the y-axis may be understood as a width direction of the electronic device.

Second, in an embodiment of this application, "upper" or "lower" refers to a positional relationship in the direction of the z-axis, "upper" refers to a positive direction along the z-axis, and "lower" refers to a negative direction along the z-axis.

Third, in the embodiments shown in the following, "the first", "the second", and various numerical numbers are merely described for convenient differentiation, and are not used to limit the scope of the embodiment of this application. For example, the numerical numbers are used to distinguish between different display buffers.

Fourth, in an embodiment of this application, a mobile phone is used as an example of an electronic device for description.

Fifth, in an embodiment of this application, the "front-facing camera" is used by a user to photograph a foreground or take a selfie.

Figure 7:
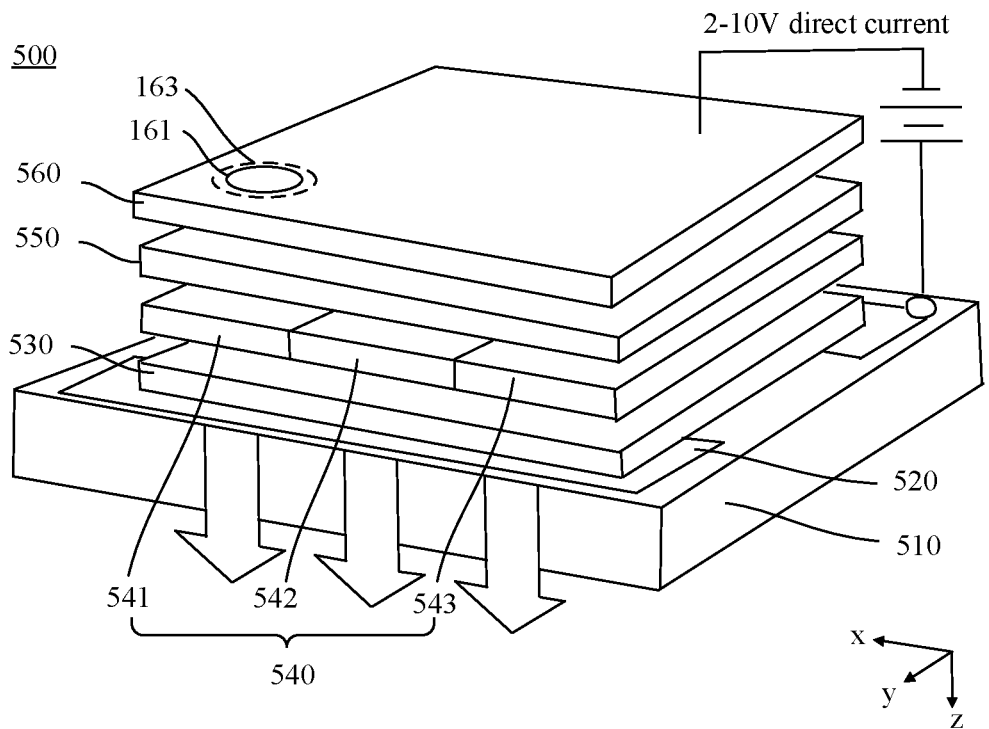
FIG. 7 is a schematic structural diagram of a display screen of an electronic device according to an embodiment of this application.

FIG. 7 is a schematic structural diagram of an organic light-emitting diode (organic light-emitting diode, OLED) display screen 500 of the electronic device 100. The OLED display screen 500 includes a glass substrate 510, an anode 520, a hole transport layer 530, an organic light emitting layer 540, an electron transport layer 550, and a metal cathode 560. A material of the substrate 510 may be transparent plastic, glass, or metal foil, and the substrate 510 is configured to support the entire organic light-emitting diode display screen 500. The anode 520 is transparent, so that light emitted inside the device can be observed from the outside. The anode 520 is connected to a positive electrode of an external drive voltage (2-10V direct current) of the device. Holes in the anode 520 move to the organic light emitting layer 540 in the device under the driving of the external drive voltage. When current flows in the electronic device 100, the anode 520 may eliminate electrons. The hole transport layer 530 includes organic material molecules used to transmit "holes" from the anode 520 to the organic light emitting layer 540. The organic light emitting layer 540 includes organic material molecules. The organic light emitting layer 540 is configured to emit light. The organic light emitting layer 540 includes a red light emitting layer 541, a green light emitting layer 542, and a blue light emitting layer 543. The electron transport layer 550 includes organic material molecules, and these molecules transmit "electrons" from the metal cathode 560. The metal cathode 560 may be transparent, or may be opaque. When current flows in the electronic device 100, the metal cathode 560 injects electrons into the circuit.

Under the action of an external electric field, electrons are transmitted from the metal cathode 560 to the electron transport layer 550, and the electron transport layer 550 transmits the electrons from the metal cathode 560 to the organic light emitting layer 540. Likewise, holes are transmitted from the anode 520 to the hole transport layer 530, and the hole transport layer 530 transmits the holes from the anode 520 to the organic light emitting layer 540, so that the electrons and holes are recombined in the organic light emitting layer 540 to emit photons. The photons are emitted from the substrate 510 to implement luminescence of the OLED 500.

Based on the OLED shown in FIG. 7, an embodiment of this application provides two display screen structures of the electronic device 100. In a first display screen structure, based on the OLED shown in FIG. 7, an area that is on the OLED and that is corresponding to the front-facing camera 162 is filled with a transparent material. For example, as shown in FIG. 7, an area opposite to the front-facing camera 162 is 163, and the front-facing camera 162 is disposed on a side of the metal cathode 560 of the display screen, where a projection size of the front-facing camera 162 on the xy plane is the same as or similar to a projection size of a transparent material-filled area on the xy plane. In a second display screen structure, based on FIG. 7, the electronic transport layer 550, the organic light emitting layer 540, and the hole transport layer 530 in the OLED structure are all made of transparent materials.

1. Display Screen Structures

The following separately describes the foregoing two display screen structures. For ease of description, in an embodiment of this application, the first display screen structure is denoted as a display screen structure 1, and the second display screen structure is denoted as a display screen structure 2.

(1) Description of a Manufacturing Process of the Display Screen Structure 1

Figure 8:
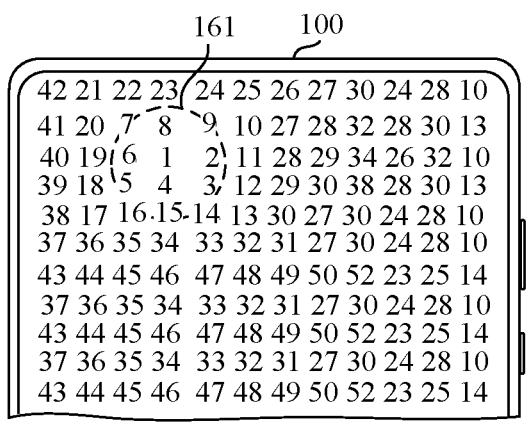
FIG. 8 is a schematic diagram of pixel-level coordinates according to an embodiment of this application.

In the manufacturing process of the display screen structure 1, a conventional OLED manufacturing process is followed, and after a conventional OLED manufacturing process, the following manufacturing process is further performed: marking a coordinate matrix of a pixel level of an area that is on the OLED and that is corresponding to the front-facing camera 162. For example, as shown in FIG. 8, pixel-level coordinate matrix marking is performed at the position of the area 161 corresponding to the front-facing camera 162 on the display screen of the electronic device 100, and a transparent material is filled when the position of the area 161 corresponding to the front-facing camera 162 (that is, a marked pixel-level coordinate matrix) is detected.

Optionally, after the foregoing display screen structure 1 is manufactured, the foregoing display screen may include a first display screen and a second display screen. The first display screen is corresponding to an area other than an area corresponding to the foregoing front-facing camera 162, the second display screen is corresponding to the area corresponding to the front-facing camera 162, and a material of the second display screen is a transparent material.

(2) Description of a Manufacturing Process of the Display Screen Structure 2

In the manufacturing process, the display screen structure 2 is manufactured in a sequence of a substrate, an anode, a hole electron layer, an organic light emitting layer, an electron transport layer, and a metal cathode. Before the screen structure 2 is manufactured, corresponding position coordinates of three layers (a hole electron layer, an organic light emitting layer, and an electron transport layer) of transparent material may be marked. For example, as described in FIG. 7, position coordinates of the hole electron layer 530, the organic light emitting layer 540, and the electronic transport layer 550 are separately marked. For example, the coordinate of the hole electron layer 530 along the z-axis is z1, the coordinate of the organic light emitting layer 540 along the z-axis is z2, and the coordinate of the electronic transport layer 550 along the z-axis is z3. When it is detected that the z-axis coordinate of the current to-be-manufactured layer is z1, the to-be-manufactured layer is made of a transparent material; when it is detected that the z-axis coordinate of the current to-be-manufactured layer is z2, the to-be-manufactured layer is made of a transparent material; and when it is detected that the z-axis coordinate of the current to-be-manufactured layer is z3, the to-be-manufactured layer is made of a transparent material.

Optionally, after the foregoing display screen structure 2 is manufactured, a material of the foregoing display screen is a transparent material.

Figure 9:
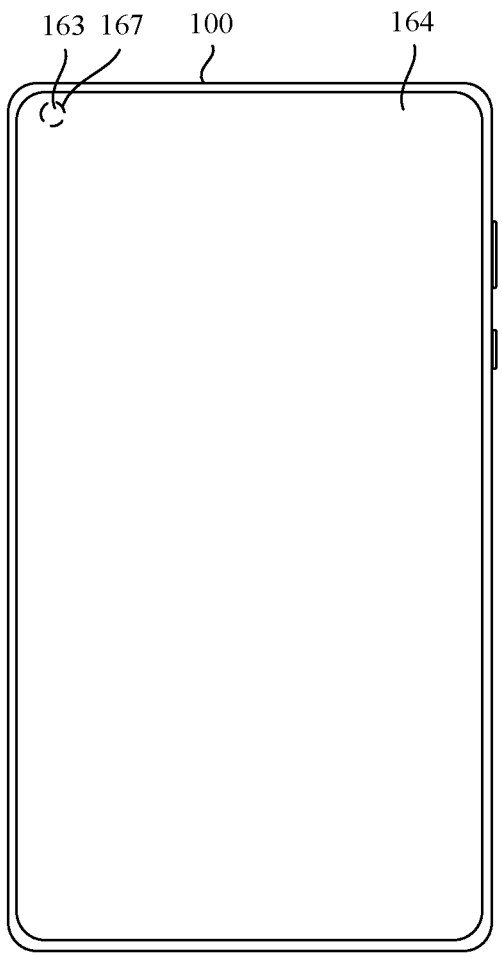
FIG. 9 is a schematic structural diagram of an electronic device according to an embodiment of this application.

For example, FIG. 9 is a schematic diagram of an electronic device 100 according to an embodiment of this application. Regardless of whether the electronic device 100 uses the foregoing display screen structure 1 or the foregoing display screen structure 2, when the electronic device 100 is in an off-screen state or the front-facing camera 162 of the electronic device 100 is started, a position corresponding to the front-facing camera 162 may present a color of the front-facing camera or present a color similar to the color of the camera.

2. Drive Circuit of a Display Signal in a Display Area of a Display Screen

For ease of description, the position area of the display screen corresponding to the front-facing camera 162 is denoted as a transparent area, and the area of the display screen other than the position area corresponding to the front-facing camera 162 is denoted as a non-transparent area. As shown in FIG. 9, the transparent area is 163, and the non-transparent area is 164.

The electronic device 100 provided in an embodiment of this application may further include a first display buffer, where the first display buffer stores a display signal of the transparent area 163 and a display signal of the non-transparent area 164. The first display buffer may send the display signal of the non-transparent area 164 to the non-transparent area 164, and the first display buffer may further determine, based on whether the camera is started, whether to send the display signal of the transparent area 163 to the transparent area 163. Specifically, when the front-facing camera 162 of the electronic device 100 is not started, the first display buffer may send the display signal of the transparent area 163 to the transparent area 163, and control matching between the display signal sent to the transparent area 163 and the display signal sent to the non-transparent area 164; or when the front-facing camera 162 of the electronic device 100 is started, the first display buffer may prevent the display signal of the transparent area 163 from being sent to the transparent area 163.

When the foregoing camera 162 is started, the camera 162 may capture an image by using the transparent area 163.

Matching between a display signal sent to the transparent area 163 and a display signal sent to the non-transparent area 164 may be understood as: On the display screen of the electronic device 100, content displayed in the transparent area 163 and content displayed in the non-transparent area 164 may form a complete image.

The following describes in detail, in a manner 1 and a manner 2, driving of a display signal in a display area of a display screen. Regardless of whether the display signal of the display area of the display screen is driven in either of the following two manners, the first display buffer sends the display signal of the non-transparent area 164 to the non-transparent area 164.

Manner 1: The transparent area 163 and the non-transparent area 164 use one set of drive circuits.

Figure 10:
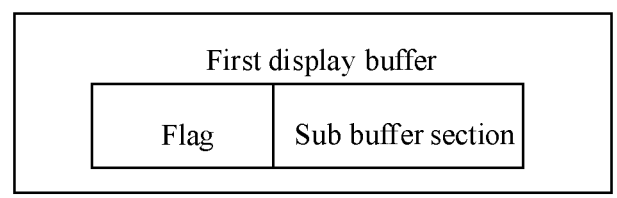
FIG. 10 is a schematic structural diagram of a display buffer according to an embodiment of this application.

As shown in FIG. 10, a sub buffer (sub buffer) section is separately set in the first display buffer (display buffer), the sub buffer section is used to store a display signal of the transparent area 163, and a flag (flag) is set for the sub buffer section, and the flag is used to indicate whether the front-facing camera 162 is started. For example, when the front-facing camera 162 of the electronic device 100 is not started, flag=true or flag=0, and in this case, the transparent area 163 displays content, and content displayed in the transparent area 163 and the non-transparent area 164 is a complete picture. When the front-facing camera 162 of the electronic device 100 is started, flag=false or flag=1, and in this case, the transparent area 163 does not display content.

Specifically, the first display buffer detects whether the front-facing camera 162 of the electronic device 100 is started. When a value of the flag in the sub buffer section is true or 0, that is, the front-facing camera 162 of the electronic device 100 is not started, the display buffer sends a display signal that is of the transparent area 163 and that is stored in the sub buffer section to the transparent area 163. In this case, the first display buffer also sends a display signal of the non-transparent area 164 to the non-transparent area 164, and content displayed in the transparent area 163 and content displayed in the non-transparent area 164 may form a complete image. In this case, a state of the transparent area 163 may be referred to as a display content mode. When the value of the flag in the sub buffer section is false or 1, that is, the front-facing camera 162 of the electronic device 100 is started, the first display buffer sends the display signal of the non-transparent area 164 stored in the display buffer to the non-transparent area 164, and the first display buffer prevents the display signal of the transparent area 163 stored in the sub buffer section in the display buffer from being sent to the transparent area 163. In this case, the first display buffer sends the display signal of the non-transparent area 164 to the non-transparent area 164, and the transparent area 163 does not display any content. The transparent area 163 presents a color of the camera 163, or the transparent area 163 presents a color similar to the color of the camera 163. In this case, the transparent area 163 may be referred to as a non-display content mode. By setting the flag to different values, it is determined whether the front-facing camera 162 is started, so that the first display buffer can control the transparent area 163 to implement switching between the display content mode and the non-display content mode.

Manner 2: The transparent area 163 and the non-transparent area 164 use two sets of drive circuits.

In addition to the foregoing first display buffer, a second display buffer may be further disposed in the electronic device 100, and the second display buffer may read a display signal stored in a transparent area 163 in the first display buffer. When the front-facing camera 162 of the electronic device 100 is not started, the second display buffer may further send, to the transparent area 163, a display signal of the transparent area 163 read from the first display buffer; or when the front-facing camera 162 of the electronic device 100 is started, the second display buffer prevents a display signal of the transparent area 163 read from the first display buffer from being sent to the transparent area 163.

Optionally, the second display buffer may determine, in two manners, whether the front-facing camera 162 of the electronic device 100 is started. In a first manner, the first display buffer may detect whether the front-facing camera 162 of the electronic device 100 is started, and send an instruction to the second display buffer, where the instruction is used to indicate whether the front-facing camera 162 of the electronic device 100 is started. The second display buffer determines, based on the foregoing instruction, whether to send the display signal of the transparent area 163 to the transparent area 163. In a second manner, the second display buffer may detect whether the front-facing camera 162 of the electronic device 100 is started, and determine, based on a result of detecting whether the front-facing camera 162 of the electronic device 100 is started, whether to send the display signal of the transparent area 163 to the transparent area 163.

The transparent area 163 and the non-transparent area 164 use independent drives and circuits. When the front-facing camera 162 of the electronic device 100 is not started, the second display buffer needs to send, to the transparent area 163, a display signal that is read from the first display buffer and that is presented in the transparent area 163, so as to present content in the transparent area 163. In this case, the first display buffer also sends a display signal of the non-transparent area 164 to the non-transparent area 164. When the front-facing camera 162 of the electronic device 100 is started, the second display buffer prevents the display signal that is read from the first display buffer and that is presented in the transparent area 163 from being sent to the transparent area 163. In this case, the first display buffer also sends the display signal of the non-transparent area 164 to the non-transparent area 164, so that the user can use the front-facing camera 162 of the electronic device 100.

3. Matching between brightness of the transparent area 163 and brightness of the non-transparent area 164

The foregoing electronic device 100 is of a display screen structure 1. For the non-transparent area 164, if the transparent area 163 needs to achieve a same display effect, the brightness of the transparent area 163 and the brightness of the non-transparent area 164 need to be matched.

Specifically, a front-facing camera 163 is disposed opposite to the transparent area 163 of the electronic device 100, and a color of the front-facing camera 163 is relatively dark, so that brightness presented in the transparent area 163 does not match brightness presented in the non-transparent area 164. Therefore, the transparent area 163 requires greater display brightness, that is, the transparent area 163 requires brightness conversion. For example, the brightness conversion coefficient may be a, and a is greater than or equal to 1. When the brightness of the non-transparent area 164 is b, an actual display brightness of the transparent area is a product of a and b.

The brightness conversion coefficient a may be obtained by collecting statistics about historical brightness data used by the user for the electronic device 100.

Specifically, the transparent area 163 may capture brightness of the non-transparent area 164 in real time, and use a product of the brightness of the non-transparent area 164 and a as the brightness of the transparent area 163.

4. Matching between a display signal of the transparent area 163 and a display signal of the non-transparent area 164

When the front-facing camera 162 of the electronic device 100 is not started, a display signal sent to the transparent area 163 and a display signal sent to the non-transparent area 164 need to be matched.

In the foregoing manner 1, because the transparent area 163 and the non-transparent area 164 use one set of drives and circuits, there is no mismatch between the display signal of the transparent area 163 and the display signal of the non-transparent area 164.

In the foregoing manner 2, because the transparent area 163 and the non-transparent area 164 use independent drives and circuits, it takes time for the display buffer corresponding to the transparent area 163 to read, from the display buffer corresponding to the non-transparent area 164, the display signal presented in the transparent area 163, and the transparent area 163 sends the read display signal of the transparent area 163 to the transparent area 163. Therefore, there may be a case in which the display signal of the transparent area 163 and the display signal of the non-transparent area 164 do not match in the foregoing manner 2.

Figure 11:
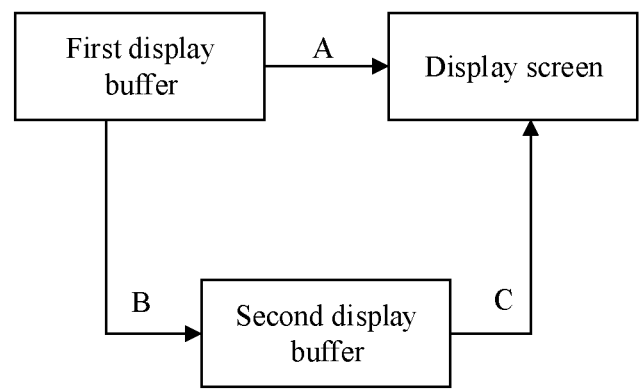
FIG. 11 is a schematic structural diagram of another display buffer according to an embodiment of this application.

For example, as shown in FIG. 11, the first display buffer is the display buffer corresponding to the non-transparent area 164, and the second display buffer is the display buffer corresponding to the transparent area 163. A sending time of the first display buffer is A, and a sending time of the display buffer 1 may be understood as a time at which the first display buffer sends the display signal to the non-transparent area 164. The second display buffer reads, from the first display buffer, the display signal presented in the transparent area 163 at a time B, and the second display buffer then sends, to the transparent area 163, the display signal read from the first display buffer that is presented in the transparent area 163 at a time C. If A=B+C, the display signal of the transparent area 163 and the display signal of the non-transparent area 164 match. If A<B+C, the display signal in the transparent area 163 and the display signal in the non-transparent area 164 do not match. In this case, the second display buffer needs to perform a frame dropping operation on the display signal in the transparent area 163. In this case, a quantity D of frames that need to be dropped by the second display buffer may be represented by using the following formula:

$$D=(B+C-A)\times f$$

where f is a frame rate, for example, the frame rate f is 60 frames/second.

The foregoing B, C, A, and f are determined by hardware of the electronic device.

For example, if the sending time A of the first display buffer is three seconds, and the sending time B+C of the second display buffer is four seconds, content displayed in the transparent area 163 is one second later than content displayed in the non-transparent area 164, that is, content displayed in the transparent area 163 in the fourth second is content that should be displayed in the transparent area 163 in the third second. Therefore, the second display buffer needs to drop D frames, so that content displayed in the transparent area 163 in the fourth second is content that should be displayed in the transparent area 163 in the fourth second, thereby implementing synchronization between the display content of the transparent area 163 and the display content of the non-transparent area 164.

For example, if the foregoing f is 60 frames/second and B+C−A=1 second, the second display buffer needs to drop 60 frames, that is, the second buffer needs to drop frames that are read from the first display buffer within 1 second. If the second display buffer reads frames within 30 seconds from the first display buffer, that is, the second display buffer reads 1800 frames, in this case, the second display buffer needs to drop the frames read within the first second of the 30 seconds, that is, the second display buffer drops frames 1-60 and sends frames 61-1800 to the second display area, so that on the electronic device, content displayed in the first display area of the display screen and content displayed in the second display area of the display screen match at the 30th second.

For example, as shown in FIG. 9, regardless of whether the electronic device 100 uses the foregoing display screen structure 1 or the foregoing display screen structure 2, when the front-facing camera 162 of the electronic device 100 is not started, the transparent area 163 and the non-transparent area 164 present corresponding content, and therefore, a boundary 167 between the transparent area 163 and the non-transparent area 164 is not presented. When the front-facing camera 162 of the electronic device 100 is started, because the transparent area 163 presents a color of the front-facing camera 162 or presents a color similar to the color of the front-facing camera 162, the non-transparent area 164 presents corresponding content, the boundary 167 between the transparent area 163 and the non-transparent area 164 is presented. For example, a shape of the boundary between the transparent area 163 and the non-transparent area 164 may be circular, oval, or polygonal.

Optionally, the content displayed in the transparent area 163 may not match the content displayed in the non-transparent area. For example, the content displayed in the transparent area 163 has nothing to do with the content displayed in the non-transparent area 164. In some embodiments, the transparent area 163 may display fixed content. For example, the fixed content may be time or a logo (logo).

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising:
 a display screen, wherein the display screen comprises a first display area and a second display area, and wherein a material of a display screen corresponding to the second display area is a transparent material;
 a camera, wherein the camera is disposed below the display screen and opposite to the second display area; and
 a first display buffer, wherein the first display buffer is configured to:
  store a display signal of the first display area and a display signal of the second display area;
  send the display signal of the first display area to the first display area;
  determine whether the camera is started;

when the camera is not started, send the display signal of the second display area to the second display area, and control matching between the display signal sent to the first display area and the display signal sent to the second display area; and when the camera is started, prevent the display signal of the second display area from being sent to the second display area, wherein a display brightness of the second display area is a multiplied by a display brightness of the first display area, and wherein a is greater than or equal to 1.

2. The electronic device of claim 1, wherein the first display buffer comprises a sub buffer section configured to store the display signal of the second display area, wherein the sub buffer section comprises a flag, and wherein the flag indicates whether the camera is started.

3. The electronic device of claim 2, wherein a value of the flag is true when the camera is not started, and wherein the value of the flag is false when the camera is started.

4. The electronic device of claim 1, further comprising a second display buffer configured to:
read the display signal that is of the second display area and that is stored in the first display buffer;
when the camera is not started, send the display signal of the second display area to the second display area; and
when the camera is started, prevent the display signal of the second display area from being sent to the second display area.

5. The electronic device of claim 4, wherein when the camera is not started, the second display buffer is further configured to drop a frame, so that the display signal sent to the first display area matches the display signal sent to the second display area, and
wherein the second display buffer is further configured to determine a quantity D of dropped frames based on a formula given by:

$$D=(B+C-A)\times f$$

wherein f is a frame rate, A is a time at which the first buffer sends the display signal of the first display area to the first display area, B is a time at which the second buffer reads the display signal of the second display area from the first buffer, and C is a time at which the second buffer sends the display signal of the second display area to the second display area.

6. The electronic device of claim 5, wherein when the camera is started, the camera captures an image using the second display area.

7. The electronic device of claim 6, wherein the display screen comprises a first display screen and a second display screen, wherein the first display screen corresponds to the first display area, and wherein the second display screen corresponds to the second display area.

8. The electronic device of claim 1, wherein a material of the display screen corresponding to the first display area is a transparent material.

9. The electronic device of claim 1, wherein a value of a is based on historical brightness data statistics of the electronic device.

10. A method, comprising:
storing, in a first display buffer, a display signal of a first display area and a display signal of a second display area, wherein a display screen comprises the first display area and the second display area, and wherein a camera is disposed below the display screen and opposite to the second display area;
sending the display signal of the first display area to the first display area;
determining whether the camera is started;
sending the display signal of the second display area to the second display area, and controlling matching between the display signal sent to the first display area and the display signal sent to the second display area when the camera is not started; and
preventing the display signal of the second display area from being sent to the second display area when the camera is started.

11. The method of claim 10, wherein the first display buffer comprises a sub buffer section configured to store the display signal of the second display area, wherein the sub buffer section comprises a flag, and wherein the flag indicates whether the camera is started.

12. The method of claim 11, wherein a value of the flag is true when the camera is not started, and wherein the value of the flag is false when the camera is started.

13. The method of claim 10, further comprising:
reading, by a second display buffer, the display signal that is of the second display area and that is stored in the first display buffer;
sending, by the second display buffer, the display signal of the second display area to the second display area when the camera is not started; and
preventing the display signal of the second display area from being sent to the second display area when the camera is started.

14. The method of claim 13, further comprising:
dropping, by the second display buffer, a frame when the camera is not started, so that the display signal sent to the first display area matches the display signal sent to the second display area; and
determining, by the second display buffer, a quantity D of dropped frames based on a formula given by:

$$D=(B+C-A)\times f$$

wherein f is a frame rate, A is a time at which the first buffer sends the display signal of the first display area to the first display area, B is a time at which the second buffer reads the display signal of the second display area from the first buffer, and C is a time at which the second buffer sends the display signal of the second display area to the second display area.

15. The method of claim 14, wherein the camera being started comprises capturing, by the camera, an image using the second display area.

16. The method of claim 15, wherein the display screen comprises a first display screen and a second display screen, wherein the first display screen corresponds to the first display area, and wherein the second display screen corresponds to the second display area.

17. The method of claim 10, wherein a display brightness of the second display area is a multiplied by a display brightness of the first display area, and wherein a is greater than or equal to 1.

18. The method of claim 17, wherein a material of the display screen corresponding to the first display area is a transparent material.

19. An electronic device, comprising:
a display screen, wherein the display screen comprises a first display area and a second display area, and wherein a material of a display screen corresponding to the second display area is a transparent material;
a camera, wherein the camera is disposed below the display screen and opposite to the second display area;

a first display buffer; and
a second display buffer,
wherein the first display buffer is configured to:
- store a display signal of the first display area and a display signal of the second display area;
- send the display signal of the first display area to the first display area;
- determine whether the camera is started;
- send an instruction to the second display buffer that indicates whether the camera is started; and
- when the camera is not started, control matching between the display signal sent to the first display area and the display signal sent to the second display area; and wherein the second display buffer is configured to:
- read the display signal that is of the second display area and that is stored in the first display buffer;
- when the instruction indicates that the camera is not started, send the display signal of the second display area to the second display area; and
- when the instruction indicates that the camera is started, prevent the display signal of the second display area from being sent to the second display area, wherein when the camera is not started, the second display buffer is further configured to drop a frame, so that the display signal sent to the first display area matches the display signal sent to the second display area, and wherein the second display buffer is further configured to determine a quantity D of dropped frames based on a formula given by:

$$D=(B+C-A)\times f$$

where f is a frame rate, A is a time at which the first buffer sends the display signal of the first display area to the first display area, B is a time at which the second buffer reads the display signal of the second display area from the first buffer, and C is a time at which the second buffer sends the display signal of the second display area to the second display area.

20. The electronic device of claim 19, wherein a display brightness of the second display area is a multiplied by a display brightness of the first display area, and wherein a is greater than or equal to 1.

* * * * *

UNITED STATES PATENT AND TRADEMARK OFFICE
CERTIFICATE OF CORRECTION

PATENT NO. : 12,289,422 B2  
APPLICATION NO. : 17/749809  
DATED : April 29, 2025  
INVENTOR(S) : Nan Yang and Dan Wang Page 1 of 1

It is certified that error appears in the above-identified patent and that said Letters Patent is hereby corrected as shown below:

In the Claims

Claim 5, Column 17, Line 40: "wherein fis a frame" should read "wherein f is a frame"

Signed and Sealed this  
Seventeenth Day of June, 2025

Coke Morgan Stewart  
*Acting Director of the United States Patent and Trademark Office*